United States Patent [19]
Eschbach et al.

[11] Patent Number: 5,757,975
[45] Date of Patent: May 26, 1998

[54] ARTIFACT REDUCTION FOR LARGE DYNAMIC RANGE INPUT DATA IN JPEG COMPRESSION

[75] Inventors: Reiner Eschbach, Webster; James E. Bollman, Williamson, both of N.Y.

[73] Assignee: Xerox Corporation, Stamford, Conn.

[21] Appl. No.: 754,582

[22] Filed: Nov. 21, 1996

[51] Int. Cl.$^6$ .................. G06T 5/00; G06K 9/38; H04N 1/407
[52] U.S. Cl. ............ 382/251; 382/275; 358/429; 358/455; 358/463
[58] Field of Search ..................... 382/254, 274, 382/251, 250, 248, 275; 358/455, 447, 429, 432, 433, 463

[56] References Cited

U.S. PATENT DOCUMENTS

| | | | |
|---|---|---|---|
| 5,224,178 | 6/1993 | Madden et al. | 382/274 |
| 5,278,667 | 1/1994 | Takahashi | 358/455 |
| 5,339,368 | 8/1994 | Higgins-Luthman et al. | 382/250 |
| 5,359,676 | 10/1994 | Fan | 358/433 |
| 5,379,122 | 1/1995 | Eschbach | 358/433 |
| 5,521,718 | 5/1996 | Eschbach | 358/432 |
| 5,589,950 | 12/1996 | Fujimoto et al. | 358/455 |

*Primary Examiner*—Scott Rogers
*Attorney, Agent, or Firm*—Robert Cumha

[57] ABSTRACT

A method of correcting out-of-range 8-bit pixel values, which should range from 0 to 255 by successively finding an out-of-range pixel, correcting it by adding (subtracting) an amount to restore that value to 0 (255), and then subtracting (adding) an equal amount to an adjacent pixel or pixels. An alternative, most useful for text, is to find an out-of-range pixel, and then replace it, and all adjacent pixels that are within a predetermined limit of 0 (255), with 0 (255).

10 Claims, 1 Drawing Sheet

ARTIFACT REDUCTION FOR LARGE DYNAMIC RANGE INPUT DATA IN JPEG COMPRESSION

BACKGROUND OF THE INVENTION

A method for reducing artifacts and noise introduced into image data by lossy data handling procedures, such as compression/decompression by deriving a local estimate for the amplitude of the artifacts and correcting the image responsive to said estimate.

In a typical printing system, a digital image received from any source such as a scanner or graphic generator will generally be compressed before storage or transmission, and decompressed prior to printing on a raster output scanner (ROS). In some data handling procedures such as JPEG compression and decompression there will be some loss of information, resulting in the creation of artifacts. For example, the ADCT standard describes the procedure to compress and decompress digital images. The decompression can be described as:

1. reversing lossless statistical data encoding
2. rearranging the resultant DCT coefficients into 8×8 blocks
3. multiplying the resultant DCT coefficients with the Q-Table entries,
4. performing the inverse DCT on the DCT coefficients, and
5. mapping the resultant image data into the range of 0 to 255 by reducing to 255 all pixels above 255 and increasing to 0 all negative pixels.

The last step is necessary because, even though all input pixels are between 0 and 255, quantization effects (the Gibbs phenomenon) in the processing result in out-of-range values. Simply bringing negative values up to zero, and limiting positive values to a maximum of 255, results in errors in small area density, even if the DC term is correctly preserved For a numerical example, assume that a large area should have a constant density of 3, but that in one small sub-area the values vary from 0 to 6 while in an adjacent sub-area the values tend to vary from −5 to 11. Using simple mapping, the values in the first area will not be changed but the negative values in the second sub-area will be increased. The net result is that the sub-areas will have different final densities, resulting in a visible artifact.

U.S. Pat. No. 5,379,122 entitled "Decompression of Standard ADCT-Compressed Images" by R. Eschbach, filed Oct. 2, 1992 and assigned to the same assignee as the present invention, and U.S. Pat. No. 5,359,676, with the same title, by Z. Fan, filed on Jul. 19, 1993, teach variations on an iterative ADCT decompression method that, after filtering, interactively checks to assure that the filtered and decompressed image is an image that could have been derived from the original image. During each iteration, a check is made, and, if required, an adjustment is made to the ADCT coefficients, if a possible image is not represented. These references suggested that every block of coefficients is operated upon in an identical manner, and therefore subject to at least one iteration by the system described.

It subsequently became evident that there is a need to reduce the number of iterations where possible, particularly in software embodiments. U.S. Pat. No. 5,521,718, entitled Efficient Iterative Decompression of Standard ADCT-Compressed Images, by R. Eschbach, filed Dec. 5, 1994, teaches that determining the number of iterations required for any given image block on the basis of statistical encoding provides a fast, simple way of optimizing decompression performance.

A simpler procedure to correct out-of-range values without producing these sub-area artifacts is needed. In another aspect of the proposed invention, the Gibbs phenomenon (ringing) introduced by the lossless compression can be reduced by using the out-of-range data as an input to a local noise/artifact estimation that is applied to a selected set of pixels in the neighborhood of the pixels used for the noise estimations.

SUMMARY OF THE INVENTION

One of the preferred embodiments of the present invention corrects out-of-range values by bringing the out-of-range values to the closest in-range available and subsequently adding the inverse of the required correction term to a selected neighborhood. For example, if the current pixel has a starting value of −2, then a value of 2 is added to the current pixel, bringing it to the closest in-range value of "0", and a value of 2 is subtracted from an adjacent pixel. The result is that the out-of-range value of the current pixel has been brought into range but the local area density has not been changed.

DETAILED DESCRIPTION OF THE INVENTION

Figure 1:
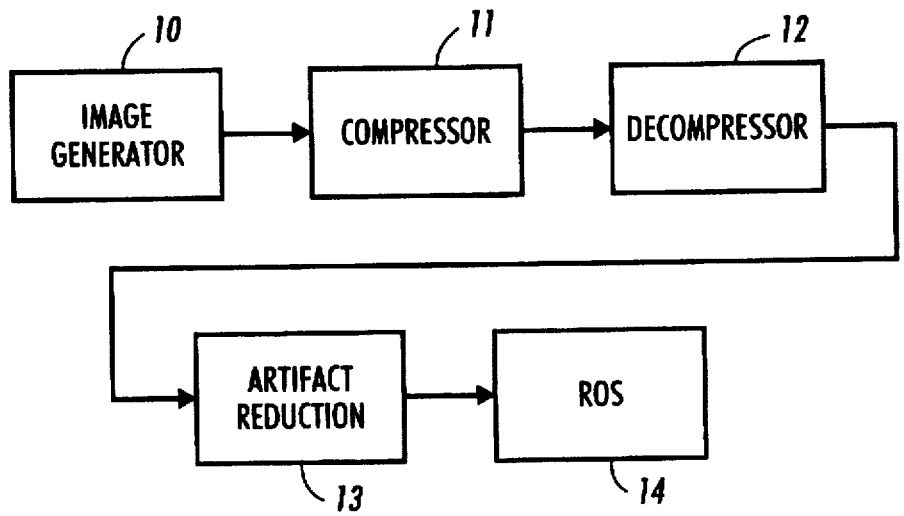
FIG. 1 is an overall block diagram of a printing system.

FIG. 1 is an overall block diagram of a printing system. The image is generated in an image generator 10 such as a scanner or graphic generator, is typically compressed in a compressor 11 before transmission or storage, is decompressed in a decompressor 12 prior to printing, and is finally sent to a printer 14. This compression/decompression is commonly done using the JPEG industry standard. To the extent that the pixels leaving the decompressor contain artifacts, they are reduced in an artifact corrector 13.

The JPEG standard includes the prescription to limit the data within the valid dynamic range. The straightforward mapping used in JPEG is:

if(output<0) output=0 if(output>255) output=255

These settings are very reasonable for a standard input image, where very few pixels will exceed the dynamic range after the inverse DCT. In situations, however, where the input data was stretched, a large fraction of the pixels might be outside the dynamic range. The stretching of the pixels is necessary to optimize image quality by reducing background, stains, bleedthrough, etc., in the original and can not be eliminated from the processing. Additionally, the stretching also provides a cleaner image that is more amendable to compression by reducing the image noise. The price paid is non-symmetric ringing at edges which is perceived as edge blur.

The proposed method deviates from the standard implementation by replacing the simple clipping of the dynamic range by a window operation. In the proposed method, it is assumed that the input image was derived by stretching the original scan-data. The reduction of the ringing artifact will be performed without direct regard for the local brightness of the image.

The following is a numerical example to illustrate the proposed method. For simplicity, we will limit the discussion to a 3×3 window, however, in the preferred embodiment, a 5×5 window was used.

In the first step of the method, a pixel outside the dynamic range is detected and on detection, the neighborhood is examined to reduce the artifact. The method can best be explained by using a simple example. Assume, for simplicity, an area of 4×4 pixels with the following values:

| 0 | 12 | 7 | 255 |
|---|----|---|-----|
| 3 | 2 | −10 | 253 |
| 9 | −9 | −6 | 255 |
| 4 | 12 | 4 | 254 |

In this case, the first out-of-range number that is encountered (in standard left-right, top-bottom processing) is the value "−10". This value indicates a noise amplitude of "at least 10 units" at that location. The algorithm then detects all neighboring pixels whose value deviates from the dynamic range boundaries by not more than "a" times that noise amplitude, i.e., a pixel is marked if 256 GT value GT or=255−a×Amplitude or 0 LT value LT or=a×Amplitude, (LT=less than, GT=greater than) where a=2 is used throughout this description.

Using these values and for the simple 3×3 example, 3 of the 8 pixels surrounding the pixel with value "−10" are positive and less than 20 (2a) and can be used as noise estimates of their respective neighborhoods). In the next step, these three pixels are clipped to the dynamic range boundaries ("0" and "255") giving:

| 0 | 0 | 0 | 255 |
|---|---|---|-----|
| 3 | 0 | 0 | 255 |
| 9 | −9 | −6 | 255 |
| 4 | 12 | 4 | 254 |

In the next step, the "−9" is detected and processing results in:

| 0 | 0 | 0 | 255 |
|---|---|---|-----|
| 0 | 0 | 0 | 255 |
| 0 | 0 | −6 | 255 |
| 0 | 0 | 0 | 254 | and as last step for the example pixels, the "−6" is processed, giving:

| 0 | 0 | 0 | 255 |
|---|---|---|-----|
| 0 | 0 | 0 | 255 |
| 0 | 0 | 0 | 255 |
| 0 | 0 | 0 | 255 |

It is clear from this example, that the ringing around text/line edges can be reduced.

The proposed method reduces noise in text areas of JPEG compressed data, while at the same time not negatively impacting image areas. This is achieved by keying the algorithm off the dynamic range of the overshoots and undershoots (Gibb's phenomenon).

An additional variation of the above-described concept can be explained using Tables 1 and 2. Table 1a shows an 8×8 block for a grayscale image and Table 1b shows a text image.

TABLE 1a

8 × 8 input block of a contone image.

| 62 | 46 | 47 | 54 | 56 | 55 | 46 | 40 |
|---|---|---|---|---|---|---|---|
| 65 | 45 | 47 | 59 | 59 | 57 | 46 | 33 |
| 75 | 52 | 51 | 65 | 69 | 68 | 57 | 46 |
| 92 | 61 | 52 | 68 | 79 | 80 | 74 | 63 |
| 113 | 85 | 58 | 65 | 82 | 92 | 90 | 81 |
| 125 | 110 | 75 | 60 | 72 | 96 | 107 | 98 |
| 130 | 126 | 103 | 70 | 62 | 81 | 106 | 105 |
| 127 | 132 | 123 | 112 | 117 | 133 | 137 | 142 |

TABLE 1b

8 × 8 input block of a text image.

| 255 | 255 | 255 | 255 | 255 | 255 | 255 | 255 |
|---|---|---|---|---|---|---|---|
| 255 | 255 | 255 | 255 | 255 | 255 | 255 | 167 |
| 255 | 255 | 255 | 255 | 255 | 255 | 119 | 5 |
| 255 | 255 | 255 | 255 | 255 | 173 | 0 | 0 |
| 255 | 255 | 255 | 247 | 143 | 39 | 0 | 0 |
| 255 | 255 | 255 | 137 | 0 | 0 | 0 | 0 |
| 255 | 255 | 167 | 37 | 0 | 0 | 0 | 0 |
| 255 | 119 | 5 | 0 | 0 | 0 | 0 | 0 |

Table 2 shows the corresponding reconstructions using the default Q-table for the two blocks. In this case, the data is shown with no mapping performed [in (a) and (b)], and with the standard mapping performed [in (c)]. From the large number of out-of-range pixels, it is obvious that the resultant reconstruction is prone to show severe artifacts. In this case, a recompression of the reconstructed data results in a change of 3 of the 4 lowest frequency components. The noise is clearly visible in the data of the dark and light regions of Table 2c.

TABLE 2a

Reconstruction of an 8 × 8 input block of a contone image.

| 63 | 46 | 39 | 51 | 58 | 50 | 43 | 44 |
|---|---|---|---|---|---|---|---|
| 70 | 53 | 46 | 57 | 66 | 58 | 45 | 39 |
| 72 | 55 | 47 | 59 | 72 | 69 | 54 | 43 |
| 86 | 68 | 54 | 62 | 79 | 86 | 78 | 66 |
| 113 | 93 | 71 | 66 | 80 | 94 | 94 | 87 |
| 125 | 108 | 81 | 63 | 68 | 84 | 91 | 88 |
| 127 | 119 | 99 | 77 | 76 | 93 | 106 | 106 |
| 136 | 138 | 126 | 108 | 107 | 127 | 143 | 146 |

TABLE 2b

Reconstruction of an 8 × 8 input block of a text image, indicating all out-of-range values.

| 246 | 268 | 253 | 246 | 268 | 255 | 237 | 261 |
|---|---|---|---|---|---|---|---|
| 267 | 239 | 259 | 261 | 241 | 278 | 261 | 145 |
| 249 | 260 | 242 | 233 | 259 | 240 | 130 | 18 |
| 254 | 279 | 259 | 255 | 261 | 158 | 23 | −15 |
| 258 | 235 | 267 | 249 | 127 | 43 | 18 | −20 |
| 252 | 262 | 233 | 131 | 19 | −18 | −7 | −5 |
| 264 | 266 | 150 | 33 | 19 | 2 | −16 | 23 |
| 247 | 113 | 23 | 1 | −13 | −3 | 9 | −12 |

TABLE 2c

Reconstruction of an 8 × 8 iput block of a text image, including the final mapping of the dynamic range.

| 246 | 255 | 253 | 246 | 255 | 255 | 237 | 255 |
|-----|-----|-----|-----|-----|-----|-----|-----|
| 255 | 239 | 255 | 255 | 255 | 241 | 255 | 145 |
| 249 | 255 | 242 | 233 | 255 | 240 | 130 | 18  |
| 254 | 255 | 255 | 255 | 255 | 158 | 23  | 0   |
| 255 | 235 | 255 | 249 | 127 | 43  | 18  | 0   |
| 252 | 255 | 233 | 131 | 19  | 0   | 0   | 0   |
| 255 | 255 | 150 | 33  | 19  | 2   | 0   | 23  |
| 247 | 113 | 23  | 1   | 0   | 0   | 9   | 0   |

The proposed method deviates from the standard implementation by replacing the simple clipping of the dynamic range by a 3×3 window operation. In this case, a pixel outside the dynamic range is detected and on detection, the 3×3 neighborhood is examined to reduce the artifact. The method can best be explained by using a simple example. Assume, for simplicity, an area of 4×4 pixels with the following values:

| 10 | 12  | 7  | 255 |
|----|-----|----|-----|
| 3  | 2   | −4 | 253 |
| 9  | −9  | −6 | 255 |
| 4  | −12 | 4  | 254 |

In this case, the first out-of-range number that is encountered (in standard left-right, top-bottom processing) is the value "−4". In a simple implementation, the neighborhood is examined, starting with the pixel having the value "12". The two pixels can be brought into dynamic range without any changes in overall brightness by reducing the value of the in-range pixel by "4", giving a new array having the values:

| 10 | 8   | 7  | 255 |
|----|-----|----|-----|
| 3  | 2   | 0  | 253 |
| 9  | −9  | −6 | 255 |
| 4  | −12 | 4  | 254 |

The next out-of-range pixel has the value "−9" which is corrected using the pixels valued "2" (above left), "2" (above) and "9" (right) in the processing order to give:

| 10 | 8   | 7  | 255 |
|----|-----|----|-----|
| 0  | 0   | 0  | 253 |
| 5  | 0   | −6 | 255 |
| 4  | −12 | 4  | 254 |

The next out-of-range pixel has the value "−6" which is partly corrected using the pixel value "4", giving:

| 10 | 8   | 7  | 255 |
|----|-----|----|-----|
| 0  | 0   | 0  | 253 |
| 5  | 0   | −2 | 255 |
| 4  | −12 | 0  | 254 |

It should be noted that the pixels valued at "255" and "253" etc. are not used in the compensation. This is motivated by the fact that out-of-range values will occur at object edges and should not be corrected by softening the edge. For out-of-range values that are smaller than "0", only pixels are considered whose values are positive and smaller than a preset value Delta, with Delta being somewhere between 20 and 50. For out-of-range values that are larger than "255", only pixels are considered whose values are inside the dynamic range and larger than a preset value Delta*, with Delta* being somewhere between 205 and 235 (i.e. Delta* _255-Delta).

This method can easily be implemented and would follow, for pixels with negative values, the pseudo-code below:

```
if value[i][j] < 0 {
    /* set amount to be corrected */
    to_be_corrected −= value[i][j]
    /* check the neighborhood */
    for (3x3 neighborhood) {
        /* only operate if there is something to correct */
        while to_be_corrected != 0 {
            /* is neighborhood inside the dynamic range */
            /* AND close to the boundary? */
            if value[i*][j*] > 0 AND value[i*][j*] < Delta {
                if value[i*][j*] > to_be_corrected {
                    value[i*][*] −= to_be_corrected
                    to_be_corrected = 0
                    value[i][j] = 0
                }
                if value[i*][j*] <= to_be_corrected {
                    value[i*][j*]−= to_be_corrected
                    to_be_corrected −= value[i*][j*]
                    value[i][j] += value[i*][j*]
                    value[i*][j*] = 0
                }
            }
        }
    }
}
```

This operation subtracts the absolute value of the pixel outside the dynamic range from the pixel in the neighborhood. For bright pixels, this process is reversed and the values of neighboring pixels is adjusted upwards within the limits of the dynamic range. The net effect of this operation is that the local density is preserved and the number of pixels outside the valid dynamic range is reduced. For the example of Table 2b, the effect is shown in Table 3. A comparison of Tables 3a and 3b shows the reduction of the noise artifacts. The number of pixels outside the dynamic range is reduced dramatically (from 27 to 1) and the noise has strongly been suppressed. Table 4 shows the result after the final step of clipping all image values back into the permitted dynamic range. The reduction of the noise is obvious.

TABLE 3a

Reconstruction of an 8 × 8 input block of a text image, indicating all out-of-range values as highlight.

| 246 | 268 | 253 | 246 | 268 | 255 | 237 | 261 |
|-----|-----|-----|-----|-----|-----|-----|-----|
| 267 | 239 | 259 | 261 | 241 | 278 | 261 | 145 |
| 249 | 260 | 242 | 233 | 259 | 240 | 130 | 18  |
| 254 | 279 | 259 | 255 | 261 | 158 | 23  | −15 |
| 258 | 235 | 267 | 249 | 127 | 43  | 18  | −20 |
| 252 | 262 | 233 | 131 | 19  | −18 | −7  | −5  |
| 264 | 266 | 150 | 33  | 19  | 2   | −16 | 23  |
| 247 | 113 | 23  | 1   | −13 | −3  | 9   | −12 |

TABLE 3b

Proposed reconstruction of an 8 × 8 input block of a text image, indicating all out-of-range values as highlight.

| 255 | 255 | 255 | 255 | 255 | 255 | 255 | 255 |
|-----|-----|-----|-----|-----|-----|-----|-----|
| 255 | 254 | 255 | 255 | 255 | 255 | 255 | 145 |
| 255 | 255 | 255 | 247 | 255 | 253 | 130 | 3   |
| 255 | 255 | 255 | 255 | 255 | 158 | 3   | 0   |
| 255 | 255 | 255 | 249 | 127 | 18  | 13  | 0   |
| 255 | 255 | 247 | 131 | 19  | 0   | 0   | 0   |
| 264 | 255 | 150 | 20  | 16  | 0   | 0   | 0   |
| 255 | 113 | 23  | 1   | 0   | 0   | 6   | 0   |

It should be noted that only one compensation method over a 3×3 window was shown. An alternate method could compensate all pixels that qualify for compensation by the same amount, or could try to minimize the number of pixels that are processed in every step.

TABLE 4a

Reconstruction of an 8 × 8 input block of a text image, including the final mapping of the dynamic range.

| 246 | 255 | 253 | 246 | 255 | 255 | 237 | 255 |
|-----|-----|-----|-----|-----|-----|-----|-----|
| 255 | 239 | 255 | 255 | 255 | 241 | 255 | 145 |
| 249 | 255 | 242 | 233 | 255 | 240 | 130 | 18  |
| 254 | 255 | 255 | 255 | 255 | 158 | 23  | 0   |
| 255 | 235 | 255 | 249 | 127 | 43  | 18  | 0   |
| 252 | 255 | 233 | 131 | 19  | 0   | 0   | 0   |
| 255 | 255 | 150 | 33  | 19  | 2   | 0   | 23  |
| 247 | 113 | 23  | 1   | 0   | 0   | 9   | 0   |

TABLE 4b

Final output of the proposed method

| 255 | 255 | 255 | 255 | 255 | 255 | 255 | 255 |
|-----|-----|-----|-----|-----|-----|-----|-----|
| 255 | 254 | 255 | 255 | 255 | 255 | 255 | 145 |
| 255 | 255 | 255 | 247 | 255 | 253 | 130 | 3   |
| 255 | 255 | 255 | 255 | 255 | 158 | 3   | 0   |
| 255 | 255 | 255 | 249 | 127 | 18  | 3   | 0   |
| 255 | 255 | 247 | 131 | 19  | 0   | 0   | 0   |
| 255 | 255 | 150 | 20  | 16  | 0   | 0   | 0   |
| 255 | 113 | 23  | 1   | 0   | 0   | 6   | 0   |

Figure 2:
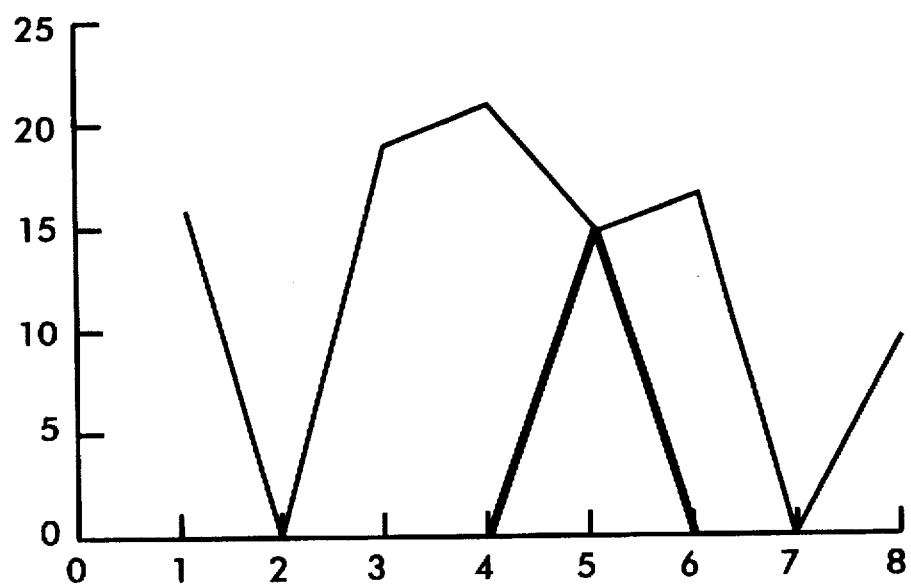
FIG. 2 is a diagram of the noise characteristic for the standard and proposed case.

FIG. 2 is a comparison of the noise characteristic [abs (input-output)] of the standard reconstruction) with the proposed method (bold) for a binary input image. Pixel #5 is the edge transition pixel.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of reducing artifacts introduced by a data handling procedure into digital image data to be printed, comprising the steps of:

receiving digital image data, finding an out-of-range pixel with a value less than 0, finding an adjacent pixel with a value greater than 0 but less than a predetermined limit, increasing the value of the out-of-range pixel, and decreasing the value of the adjacent pixel.

2. The method of claim 1 wherein the value of the out-of-range pixel is increased to 0 and the adjacent pixel is reduced to 0.

3. The method of claim 1 wherein the adjacent pixel is reduced by the absolute value of the out-of-range pixel and the value of the out-of-range pixel is then reduced to 0.

4. A method of reducing artifacts introduced by a data handling procedure into digital image data to be printed, comprising the steps of:

receiving digital image data, finding an out-of-range pixel with a value more than 255, finding an adjacent pixel with a value less than 255 but more than a predetermined limit, decreasing the value of the out-of-range pixel, and increasing the value of the adjacent pixel.

5. The method of claim 1 wherein the value of the out-of-range pixel is decreased to 255 and the adjacent pixel is increased to 255.

6. The method of claim 1 wherein the value of the adjacent pixel is increased by the difference between the value of the out-of-range pixel and 255, and then the out-of-range pixel is reduced to 255.

7. A method of reducing artifacts introduced by a data handling procedure into digital image data to be printed, comprising the steps of:

A. receiving digital image data,

B. finding an out-of-range pixel,

C. finding an adjacent pixel with a value greater than 0, if the out-of-range pixel has an absolute value smaller than that of an adjacent pixel, a. adding to the pixel a correction value which will bring the pixel value into range, and b. subtracting the correction value from the adjacent pixel, if the pixel has an absolute value larger than that of an adjacent pixel, c. increasing the out-of-range pixel by the value of the adjacent pixel, reducing the adjacent pixel value to 0, and returning to step C, and returning to step B if there are any remaining out-of-range pixels, otherwise, sending the image data to a raster output scanner.

8. The method of claim 7 wherein said data handling procedure is compression.

9. A method of reducing artifacts introduced by a data handling procedure into digital image data to be printed, comprising the steps of:

A. receiving digital image data having out-of-range pixel values,

B. finding an out-of-range pixel having a value greater than x, where the range is from 0 to x, C. finding an adjacent pixel with a value smaller than x, D. adding 1 to the adjacent pixel and subtracting 1 from the out-of-range pixel until either of them equals x, if there is still an out-of-range pixel having a value greater than x, returning to step B, otherwise, sending the image data to a raster output scanner.

10. The method of claim 9 wherein said data handling procedure is compression.

* * * * *